INVENTOR.
Eli Salem
BY Hume, Clement, Hume & Lee
Attorneys.

United States Patent Office 3,585,127
Patented June 15, 1971

3,585,127
METHOD FOR TREATING WATER BY
ION EXCHANGE
Eli Salem, Brooklyn, N.Y., assignor to Ecodyne
Corporation, Chicago, Ill.
Filed Sept. 18, 1969, Ser. No. 859,042
Int. Cl. B01d 15/06; C02b 1/68
U.S. Cl. 210—32                                     18 Claims

ABSTRACT OF THE DISCLOSURE

A method is provided for the treatment of water by ion exchange while eliminating leakage. In carrying out the method, water is first passed through a service layer of anion and cation exchange resins in a service zone in the conventional manner. Subsequently, the water is passed through a leakage barrier layer of cation exchange resin in the service zone. Periodically, the resins in the service zone are separated in a separation zone. The anion exchange resin is then regenerated in an anion resin regeneration zone, and the cation exchange resin is regenerated in a cation resin regeneration zone, which preferably also serves as the separation zone. A portion of the cation exchange resin is then transferred to the service zone to establish a leakage barrier layer. The remainder of the cation exchange resin is mixed with the anion exchange resin, and the mixed resins are transferred to the service zone to establish a service layer of anion and cation exchange resins.

Figure 1:
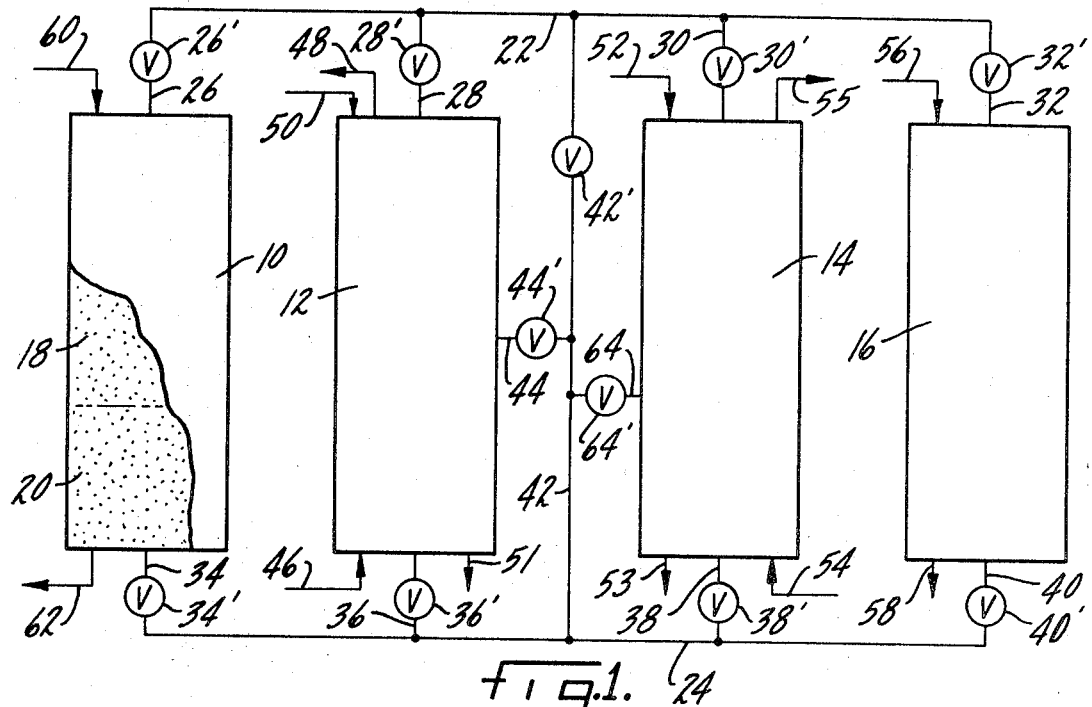

The invention also provides apparatus for carrying out the method, and requiring only two columns in addition to the service column. These columns include a separation/cation regeneration column and an anion regeneration column. In accordance with the invention, the resin transfer means include leakage barrier resin transfer means for delivering resin from a central portion of the anion regeneration column to the service column to establish a leakage barrier layer of anion exchange resin or of anion plus cation exchange resin.

The present invention relates to improvements in the treatment of water by ion exchange, and more specifically to an improved method and apparatus for treating water by ion exchange while substantially eliminating undesirable leakage.

Mixed bed systems containing anion and cation exchange resins for the purification of water have many industrial applications. A primary application of such a system is in the purification of makeup and condensate water which is used to drive steam turbines. It is essential that this water be of an extremely high purity level in order to avoid any coating on the surface of turbine blades, boilers pipes, etc. Since it is desired to produce water which is free of any residue upon evaporation, the cation exchange resin must be in the hydrogen or ammonium form, and the anion exchange resin must be in the hydroxide form. In any event, it is conventional to regenerate the cation exchange resin with a strong acid such as sulfuric or hydrochloric acid, and to regenerate the anion exchange resin with a strong base, generally sodium hydroxide. After regeneration, the cation exchange resin may optionally be converted to the ammonium form. This conversion may be accomplished by treatment with ammonium hydroxide subsequent to regeneration. More preferably, the conversion to the ammonium form simply takes place during operation of the steam system, in which ammonium hydroxide is introduced into the water to prevent corrosion.

A particular problem with mixed bed ion exchange systems of the type conventionally employed is the production of ion "leakage," particularly sodium ion leakage. The term "leakage" refers to any ions that are not removed from the water by the ion exchange resin, and thus are permitted to "leak" past the resin. As used herein, the term "leakage" also refers to any undesired ions, such as sodium, which are introduced into the water by the resin itself.

The leakage problem arises primarily from the impossibility of obtaining perfect separation of the anion and cation resins in the mixed bed prior to regeneration. As is familiar to those skilled in the art, such separation is conventionally accomplished by passing water through the resin in an upflow direction. This stream of water carries the less dense anion exchange resins to the top of the separation vessel, while the more dense cation exchange resin is permitted to sink to the bottom. While this method is effective in separating the bulk of the resins, perfect separation is not achieved. Furthermore, resin fines will be produced during use. The cation exchange resin fines will not sink to the bottom in the separation vessel, but will be carried upwardly with the anion exchange resin. When the anion exchange resin is subsequently regenerated with sodium hydroxide, sodium ions will be introduced into the ion exchange sites in the cation resin contaminant. When the resins are returned to the service column, these sodium ions will be exchanged into the water being treated, producing sodium leakage.

A similar, but less serious, problem arises from the impurity of the cation exchange resin following the separation procdeure. The minor amount of anion exchange resin which contaminates the cation exchange resin will contain sulfate ions when the regenerant is sulfuric acid. An additional problem is the silica contained by the anion exchange resin, generally in the form of silicates. This silica is ordinarily removed during the regeneration process. However, where the anion exchange resin is a contaminant in the cation exchange resin, silica will not be efficiently removed during the regeneration process, and may be carried over into the water being treated.

Generally, the present invention provides for the treatment of water by ion exchange with the elimination of residue-forming cation leakage. In carrying out the basic process, water is first passed through a service layer of anion and cation exchange resins in a service zone in the conventional manner. Subsequently, the water is passed through a leakage barrier layer of cation exchange resin in the service zone. Periodically, the resins in the service zone are separated in a separation zone. The anion exchange resin is then regenerated in an anion resin regeneration zone, and the cation exchange resin is regenerated in a cation resin regeneration zone, which preferably also serves as the separation zone. A portion of the cation exchange resin is then transferred to the service zone to establish a leakage barrier layer. The remainder of the cation exchange resin is mixed with the anion exchange resin, and the mixed resins are transferred to the service zone to establish a service layer of anion and cation exchange resins.

The present invention also provides improved apparatus for carrying out the method of the present invention. This apparatus comprises a service column, a separation/cation regeneration column, and an anion regeneration column. First resin transfer means are provided for transferring resin from a service column to the separation/cation regeneration column, while second resin transfer means are provided for delivering anion exchange resin from the separation/cation regeneration column to the anion regeneration column. Third resin transfer means are connected for delivery of cation exchange resin from the bottom of the separation/cation regeneration column to an upper portion of the anion regeneration column. In accordance with the present invention, fourth leakage barrier resin transfer means are provided for delivering central portion of ion exchange resins from the anion regeneration column to the service column, in order to establish a leakage barrier layer. This central portion may include cation or cation plus anion exchange resins, depending on the position of the leakage barrier resin transfer means. Finally, fifth resin transfer means are provided for delivering the remaining anion and cation exchange resin from the anion regeneration column to the service column.

Figure 2:
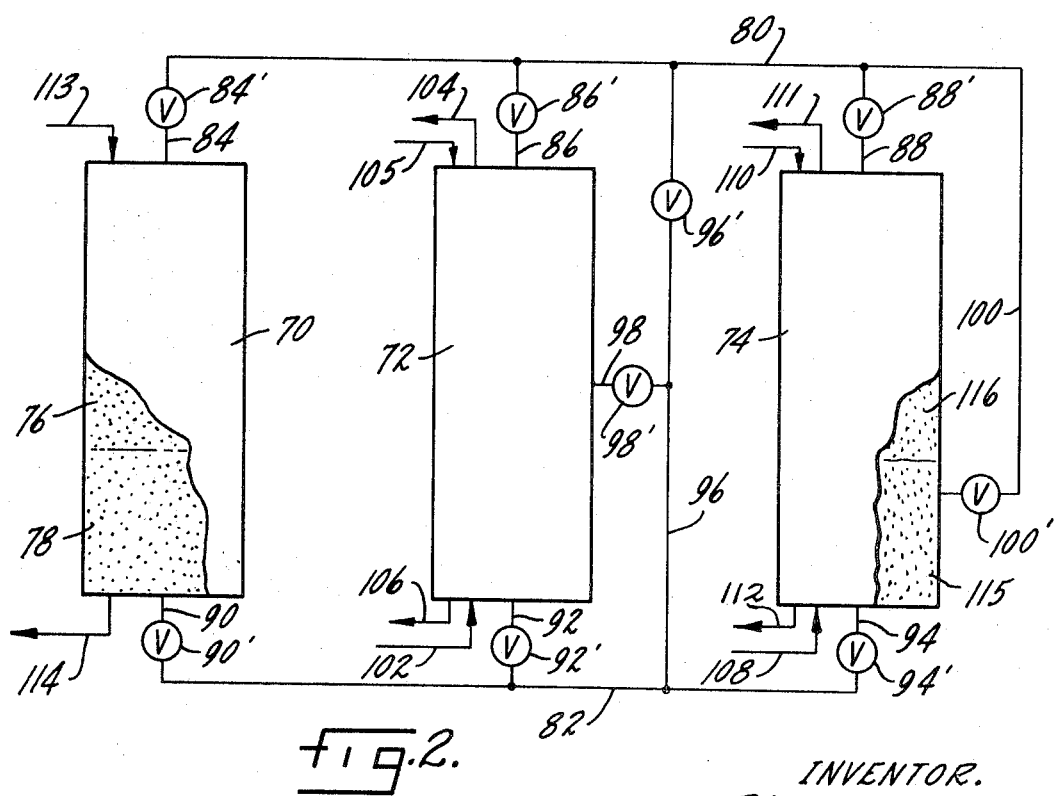

The invention will be best understood by reference to the following detailed description, taken in conjunction with the drawings, in which:

FIG. 1 is a diagrammatic illustration of an ion exchange system adapted for carrying out the method of the present invention; and FIG. 2 is a diagrammatic illustration of a second ion exchange system constructed in accordance with the present invention.

Referring to the drawings, and more particularly to FIG. 1, a suitable apparatus is made up of a number of tanks, generally referred to in the art as columns. In the apparatus of FIG. 1, these columns include a service column 10, a separation/cation regeneration column 12, an anion regeneration column 14, and a holding column 16. These columns 10, 12, 14, 16 define various zones for carrying out the method of the present invention. As those skilled in the art will understand, a commercial system will usually employ more than one service column 10 for each set of separation/cation regeneration, anion regeneration, and holding columns 12, 14, 16, respectively. Thus, by replacing the exhausted resin in only one service column 10 at a time, the remaining service columns 10 may be kept on stream. However, for simplicity, the system illustrated employs only a single service column 10, it being understood that the method of the present invention is equally well adapted to use with a system which employs a multiplicity of service columns 10.

In normal operation in accordance with the present invention, the service column 10 contains a service layer 18 of anion and cation resins and a leakage barrier layer 20. The anion and cation exchange resins in the service layer 18 will usually be mixed. The leakage barrier layer may be either cation exchange resin or mixed or stratified cation and anion exchange resins, as will hereinafter appear.

An upper transfer pipe 22 is located above the columns 10, 12, 14, 16, and a lower transfer pipe 24 is similarly positioned below the columns. The upper transfer pipe 22 communicates with an upper portion of each of the columns 10, 12, 14, 16 through upper connecting pipes 26, 28, 30, 32, respectively. Each upper connecting pipe 26, 28, 30, 32 has a valve, indicated respectively by reference numerals 26', 28', 30', 32'. In a similar manner, the lower transfer pipe 24 communicates with a lower portion of each of the columns 10, 12, 14, 16 through lower connecting pipes 34, 36, 38, 40. Each lower connecting pipe 34, 36, 38, 40 has a valve, indicated respectively by reference numerals 34', 36', 38', 40'.

Communication between the upper and lower transfer pipes 18, 20, respectively, is provided by an interconnecting pipe 42. This interconnecting pipe 42 also communicates with a central portion of the separation/cation regeneration column 12 through an anion resin outlet pipe 44 having a valve 44'. As the following description will make clear, the level at which the anion resin outlet pipe 40 communicates with the separation/cation regeneration column 12 is important to the proper operation of the apparatus.

The interconnecting pipe 42 has a valve 42' positioned between the upper transfer pipe 22 and the anion resin outlet pipe 44.

As previously mentioned, separation of resins in a separation column is conventionally accomplished by an upflow of water, which stratifies the resins in accordance with their densities and particle sizes. In the present invention, an upflow of water is introduced into the separation/cation regeneration column 12 through a water inlet pipe 46, communicating with a lower portion of the column 12, and is withdrawn at an outlet pipe 48 communicating with an upper portion of the column 12. Acid regenerant, such as sulfuric or hydrochloric acid, may be introduced into the separation/cation regeneration column 12 at a regenerant inlet pipe 50. This regenerant is withdrawn from the column 12 through a lower outlet pipe 51.

Anion exchange resin regenerant, generally sodium hydroxide, may be delivered to the anion regeneration column 14 at a regenerant inlet pipe 52 communicating with an upper portion thereof, and is withdrawn at a regenerant outlet pipe 53 communicating with the bottom portion of the anion regeneration column 14. In the preferred embodiment, the anion regeneration column 14 is also equipped with a re-stratification liquid inlet 54, communicating with the bottom thereof, and with an upper outlet 55.

In the event that it is desired to ammoniate the resin, ammonium hydroxide may be delivered to resin in the holding column 16 through an ammonia inlet pipe 56, and withdrawn through a drain 58.

During the service cycle, all valves shown in FIG. 1 are closed. Raw water from a raw water source enters the service column 10 through a raw water inlet pipe 60, and passes through the mixed resin layer 18 and then through the leakage barrier layer 20, wherein any undesired ions such as sodium are removed. The purified water exits from the service column 10 through a purified water outlet pipe 62.

In order to regenerate the resin while providing a leakage barrier layer 20 in accordance with the present invention, the flow of raw water to the service column 10 is first stopped. The valves 34', 42', 28', located respectively on the lower connecting pipe 34 below the service column 10; the interconnecting pipe 42; and the upper connecting pipe 28 above the separation/cation regeneration column 12 are opened, and resin from the service column 10 is delivered into the top of the separation/cation regeneration column 12. After this resin transfer, the open valves 34', 42', 28' are closed. At this point, the service column 10 is ready to receive a charge of regenerated resins, as hereinafter described.

The mixed resins in the separation/cation regeneration column are now separated and stratified by delivering an upflow of water through the column 12 via the water inlet pipe 46 and the outlet pipe 48. Because the anion exchange resin is less dense than the cation exchange resin, the anion exchange resin will be carried to the top of the column 12, while the cation exchange resin will remain at the bottom. As used herein, the term "'separation" refers to bulk classification of anion and cation exchange resins, in accordance with their differing densities. The term "stratification" refers to the individual classification of anion or cation exchange resin in accordance with density, by an upflow of liquid. Thus, during the separation step, the anion and cation exchange resins are not only "separated," but are also "stratified." That is, the purest cation exchange resin, which is the least likely to contain anion exchange resin contaminants is at the very bottom, while the purest anion exchange resin is at the very top.

After the resins have been separated in the separation/cation regeneration column 12, the valve 44' on the anion resin outlet pipe 44, the valve 42' on the interconnecting pipe 42, and the valve 30' on the upper connecting pipe 30 above the anion regeneration column 14 are opened, and anion resin is delivered from the separation/cation regeneration column 12 to the anion regeneration column 14. It is preferred that the anion resin outlet pipe 44 communicate with the separation/cation regeneration column 12 at a point slightly above the normal interface between the anion and cation exchange resins. This arrangement minimizes the danger of carrying cation exchange resin over with the anion exchange resin into the anion regeneration column 14. However, it is virtually impossible to completely eliminate this carry-over, while still obtaining a sufficient quantity of separated anion exchange resins. Therefore, a small amount of cation exchange resin will generally be carried over to the anion regeneration column 14 along with the anion exchange resin.

Once the above-described transfer of anion exchange resin to the anion regeneration column 14 has been completed, the open valves 44', 42', 30' are closed.

Although not essential, it is preferred to regenerate the resins in a downflow direction. The cation resin, which remains in the separation/cation regeneration column 12, is regenerated by downflow of regenerant delivered to the column 12 through the regenerant inlet pipe 50 and removed through the lower outlet pipe 51. As is familiar to those skilled in the art, a strong acid such as sulfuric or hydrochloric acid is a suitable regenerant.

At the same time, the anion resin in the anion regeneration column 14 is regenerated by downflow of regenerant, which is delivered through the column 14 via the regenerant inlet pipe 52 and outlet pipe 53. Any strong base may be employed to regenerate the anion resin, although a solution of sodium hydroxide is generally preferred. Subsequent to regeneration, both the anion and cation exchange resins are rinsed.

In the preferred embodiment of the present invention, the anion exchange resin in the anion regeneration column 14 is re-stratified by an upwardly flowing stream of liquid, so that cation exchange resin impurities will sink to the bottom. The re-stratification is accomplished by passing a stream of liquid upwardly through the anion regeneration column 14, and may take place before or after the regeneration. Re-stratification may also be performed after the rinsing step. The liquid enters the column 14 at the re-stratification liquid inlet 54, and is removed via the upper outlet 5. Re-stratification is important if it is desired to provide anion exchange resin in the leakage barrier layer 20, and/or if the bottom portion of the anion exchange resin is to be returned to the separation/cation regeneration column, as hereinafter described.

As a result of the separation step, the cation exchange resin (which has not been moved) is already properly stratified. However, in a system where the cation exchange resin has been moved, or where significant agitation has occurred, the cation exchange resin may also be re-stratified at this time.

The bottom portion of the cation exchange resin in the separation/cation regeneration column 12 is now transferred to the holding column 16 by opening the valves 36', 40' on the lower connecting pipes 36, 40 below the separation/cation regeneration and holding columns 12, 16, respectively. Because only the bottom portion of the stratified cation exchange resin in the separation/cation regeneration column 12 is transferred, this portion will be least likely to contain any anion exchange resin. In the preferred embodiment, approximately fifty percent of the cation exchange resin is transferred from the separation/cation regeneration column 12 to the holding column 16 in this step. The cation exchange resin in the holding column 16 will eventually be employed as a leakage barrier layer 20 in the service column 10.

If it is not desired to provide a leakage barrier layer 20 containing anion exchange resin, the valve 40' on the lower connecting pipe 40 below the holding column 16 is closed, and the valves 42', 30' on the interconnecting pipe 42 and the upper connecting pipe 30 above the anion regeneration vessel, respectively, are opened. The remainder of the cation exchange resin in the separation/cation regeneration column 12 is now delivered to the anion regeneration column 14 via the lower connecting pipe 36 below the separation/cation regeneration column 12, the interconnecting pipe 42, and the upper connecting pipe 30 above the anion regeneration column 14. At the end of this step, all valves are closed.

On the other hand, if it is desired to include anion exchange resin in the leakage barrier layer 30, the cation exchange resin is not transferred to the anion regeneration column 14 at this time. Instead, all valves are closed subsequent to the transfer of cation exchange resin to the holding column 16, as described above. An upper portion (generally about 50%) of stratified anion exchange resin is then withdrawn from the anion regeneration column 14 via an anion resin transfer pipe 64 having a valve 64'. The valves 42', 32' on the interconnecting pipe 42 and the upper connecting pipe 32 are also opened, so that the anion exchange resin enters the holding column 16 at the top. Thus, in this instance, the holding column 16 will contain a lower layer of anion exchange resin and an upper layer of cation exchange resin, both in a highly regenerated, highly purified state. At the end of this step, all valves are closed.

If it is desired to ammoniate the resin, an ammonium hydroxide solution is delivered to the resin in the holding column 16 through the ammonia inlet pipe 56. Although the ammonia may be withdrawn through the drain 58, in the preferred embodiment the ammonia is then conducted through the resins in the anion regeneration column 14, so that the resins in the two columns 14, 16 are ammoniated in series, the leakage barrier layer in the holding column 16 being ammoniated first.

In the most preferred embodiment of the present invention, prior to the introduction of cation exchange resin into the anion regeneration column 12, the anion exchange resin in the anion regeneration column 14 will have been back-washed and re-stratified in the manner previously described, so that most of the entrained cation exchange resin (which will now be in the sodium form) will settle to the bottom. This minor, bottom portion is now transferred from the anion regeneration column 14 back to the separation/cation regeneration column 12 via the lower transfer pipe 24 and the lower connecting pipes 36, 38 below the separation/cation regeneration column 12 and the anion regeneration column 14, respectively. This step insures the virtually complete removal of any cation exchange resin that may have been carried over from the separation/cation regeneration column 12 with the anion exchange resin during the initial transfer.

The separation/cation regeneration column 12 is now ready to receive a charge of exhausted resins from another service column 10 in the manner previously described. The regenerated cation exchange resin or cation plus anion exchange resin in the holding column 16 is now transferred to the service column 10 to form a lower leakage barrier layer. This transfer may be accomplished through the lower connecting pipe 40 below the holding column 16, the lower transfer pipe 24, the interconnecting pipe 42, the upper transfer pipe 22, and the upper connecting pipe 26 above the service column 10.

The anion and cation exchange resins in the anion regeneration column 14 may be mixed together, and are then transferred to the service column 10 through the lower connecting pipe 38, these mixed resins following the same route as the leakage barrier resins 20 to the service column 10. When delivered to the service column 10, these mixed resins from the anion regeneration column 14 form a mixed resin layer 20 above the leakage barrier layer 18.

FIG. 2 shows an embodiment of the present invention that is particularly well adapted to the provision of a leakage barrier layer containing both anion and cation exchange resins. This method and apparatus has the particular advantage that only two columns in addition to the service column(s) are required for a complete system, rather than three as required in the system shown in FIG. 1.

The embodiment illustrated in FIG. 2 comprises a service column 70, a separation/cation regeneration column 72, and an anion regeneration column 74. As with the apparatus of FIG. 1, the service column 70 defines a service zone, the separation/cation regeneration column 72 defines separation and cation regeneration zone, and the anion regeneration column 74 defines an anion regeneration zone. During operation, the service column 70 contains an upper service resin layer 76 and a lower leakage barrier layer 78. The upper layer 76 contains both anion and cation exchange resins, while the lower layer 78 may contain cation or cation plus anion exchange resins.

As with the embodiment shown in FIG. 1, an upper transfer pipe 80 is located above the columns 70, 72, 74, and a lower transfer pipe 82 is located below the columns. The upper transfer pipe 80 communicates with an upper portion of each of the columns 70, 72, 74 through upper connecting pipes 84, 86, 88, respectively. Each upper connecting pipe 84, 86, 88 has a valve indicated respectively by reference numerals 84', 86', 88'. In a similar manner, the lower transfer pipe 82 communicates with a lower portion of each of the columns 70, 72, 74 through lower connecting pipes 90, 92, 94. Each lower connecting pipe 90, 92, 94, has a valve, indicated respectively by reference numerals 90', 92', 94'.

Communication between the upper and lower transfer pipes 80, 82, respectively, is provided by an interconnecting pipe 96. This interconnecting pipe 96 also communicates with a central portion of the separation/cation regeneration column 72 through an anion resin outlet pipe 98 having a valve 98'. As with the embodiment shown in FIG. 1, the level at which the anion resin outlet pipe 98 communicates with the separation/cation regeneration column 72 is important to the proper operation of the apparatus. The interconnecting pipe 96 has a valve 96' positioned between the upper transfer pipe 80 and the anion resin outlet pipe 98.

In accordance with the present invention, a leakage barrier transfer pipe 100 having a valve 100' communicates with a central portion of the anion regeneration column 74.

As with the embodiment shown in FIG. 1, the separation/cation regeneration column 72 is provided with a water inlet pipe 102, an upper out let pipe 104, and a regenerant inlet pipe 105, and a lower outlet pipe 106. The water inlet pipe 102 and lower outlet pipe 106 communicate with the bottom of the separation/cation regeneration column 72, while the upper outlet pipe 104 and regenerant inlet pipe 105 communicate with the top of the column 72.

The anion regeneration column 74 is equipped with a re-stratification liquid inlet pipe 108, regenerant inlet pipe 110, and upper outlet pipe 111 and a lower outlet pipe 112. The re-stratification liquid inlet pipe 108 communicates with the bottom of the anion regeneration column 74, while the regenerant inlet and upper outlet pipes 110, 111, respectively, communicate with the top.

In operation, raw water is delivered downwardly through the service column 70 via a raw water inlet 113, and removed at a lower purified water outlet 114. The water therefore passes first through the service layer 76 and then through the leakage barrier layer 78. When it is desired to regenerate the resin in the service column 70, the flow of raw water to the raw water inlet 113 is halted.

Exhausted resin from the service column 70 is transferred to the separation/cation regeneration column 72 through the lower connecting pipe 90, below the service colum 70, the lower transfer pipe 82, the interconnecting pipe 96, the upper transfer pipe 80, and the upper connecting pipe 86 above the separation/cation regeneration column 72. The resins are then separated in the separation/cation regeneration column 72 by an upflow of water delivered through the water inlet pipe 102, and removed through the outlet pipe 104. After separation, the majority of the anion exchange resin is transferred to the anion regeneration column 74 via the anion resin outlet pipe 98, the interconnecting pipe 96, the upper transfer pipe 80, and the upper connecting pipe 80 above the anion regeneration column 74. The anion and cation exchange resins are then regenerated by suitable regenerants delivered through the regenerant inlet pipes 105, 110, and removed at the lower outlet pipes 106, 112. The anion exchange resin in the anion regeneration column 74 is also re-stratified by an upwardly flowing liquid, which may be delivered to the column 74 through the re-stratification liquid inlet pipe 108. This re-stratification will place the purest anion exchange resin uppermost, the more dense cation exchange resin contaminant sinking to the bottom.

It will be noted that up to this point the operation of the apparatus of FIG. 2 is the same as the operation of the apparatus of FIG. 1.

After the re-stratification of the anion exchange resin valves 92', 96', and 88' are opened, providing communication between the bottom of the separation/cation regeneration column 72 and the top of the anion regeneration column 74. The cation exchange resin is delivered to the anion resin regeneration column. During this delivery, the resin at the bottom of the separation/cation regeneration column 72 will be delivered first, so that it will also be on the bottom in the anion regeneration column 74, just above the anion exchange resin. The anion exchange resin in the anion regeneration column 74 is designated by reference numeral 115, and the cation exchange resin is designated by reference numeral 116. At the end of this step, all valves are closed.

At this point, in accordance with the preferred embodiment, a bottom portion of the resins in the anion regeneration column 74 is transferred to the separation/cation regeneration column by opening the valves 94', 92' on the lower connecting pipes 94, 92 below the anion regeneration and separation/cation regeneration columns 74, 72, respectively. Because the anion exchange resin has been re-stratified, most of the sodium-form cation exchange resin contaminant will have sunk to the bottom. This step therefore insures the virtually complete removal of any cation exchange resin that may have been carried over from the separation/cation regeneration column 72 during the initial transfer. At the end of the foregoing step, the open valves 92', 94' are closed.

If it is desired to ammoniate the resin, ammonium hydroxide is delivered downwardly through the anion regeneration column 74 via the regenerant inlet pipe 110, and is withdrawn at the lower outlet pipe 112.

Because of the way the resins have been handled, the purest cation exchange resin will be on the bottom, i.e., at the interface, while the purest anion exchange resin 115 will be at the top, i.e., also at the interface. It is therefore clear that the purest anion and cation exchange resins form the central portion of the anion and cation exchange resins in the anion regeneration column 74. It is noted that when the leakage barrier transfer pipe 100 communicates with the anion regeneration column 74 below the interfacial level of the two resins, some anion resin will be first collected, and then, as the level falls, cation resin will be collected and delivered to the service column 70. If it is not desired to include anion axchange resin in the leakage barrier layer 78, the leakage barrier transfer pipe 100 in positioned to communicate with the anion regeneration column 74 just above the interface between the two resins 115, 116.

The position of the leakage barrier transfer pipe also determines the amount of anion exchange resin that can be delivered to the leakage barrier layer 78. That is, the lower the pipe, the more anion exchange resin delivered. Where it is desired to include anion exchange resin in the leakage barrier layer, the leakage barrier transfer pipe 100 should preferably be positioned to transfer about fifty percent of the anion exchange resin 115 to the service column 70.

Once sufficient resin has been delivered to the service column 70 to form a leakage barrier layer 78, the valve 100' on the leakage barrier transfer pipe 100 is closed.

The remainder of the anion and cation exchange resins in the anion regeneration column 74 may optionally be mixed, and these resins are then transferred to the service column 70 via the lower transfer pipe 82, the interconnecting pipe 96, and the upper transfer pipe 80, so that the mixed resins form an upper service layer 76 above the leakage barrier 78 within the service column 70.

As those skilled in the art will realize, resin transfer in the apparatus shown in FIGS. 1 and 2 may be accomplished by any one of a number of means, not shown in the drawings. For example, resin transfer may be accomplished by the use of air and water pressure, water pressure alone, pumps, and the like, the resin generally being handled in an aqueous suspension.

The method of the present invention is adaptable to use with a wide variety of anion and cation exchange resins, so long as they differ in density when exhausted a sufficient amount to permit them to be separated in the separation/cation regeneration columns 12, 72. Typical solid cation exchange resins which may be employed in the present invention are those of the divinylbenzene-styrene copolymer type, the acrylic type, the sulfonated coal type, and the phenolic type. Typical solid anion exchange resins that may be employed in the present invention are the phenol-formaldehyde type, the divinylbenzenestyrene copolymer type, the acrylic type, and the epoxy type. The anion and cation resins are both preferably employed as beads in the size range of about 16–60 mesh. Suitable bead resins are sold under the trade names Amberlite, manufactured and sold by Rohm & Haas Company, and Nalco resins sold by Nalco Chemical Company. Particularly suitable ion exchange resins are sold under the trade names Amberlite IRA–900 and IRA–400 (anionic); and IRA–200 and IRA–120 (cationic).

Obviously, many modifications may be made in the precise manner in which the method of the present invention is carried out. For example, by a suitable adjustment of the operation, the anion resin may be regenerated in the separation/regeneration column 12 while the cation regeneration is transferred to the column 14 for regeneration. If it were desired to operate the service column 10 in an upflow rather than a downflow direction, the method of the present invention could be easily adapted to provide the leakage barrier 20 as the upper, rather than lower, layer in the service column 10.

Those skilled in the art will also understand that virtually an infinite variety of piping systems may be employed in order to carry out the method of the present invention. While those piping systems shown in FIGS. 1 and 2 are preferred, a number of equally workable systems could be provided without departing from the spirit and scope of the present invention.

By the same token, a number of routes can be used to transfer resin with the apparatus shown in the drawings. While the routes set forth in the foregoing detailed description are at present considered preferred, those skilled in the art will realize that numerous variations may be made within the spirit and scope of applicant's invention. Many more modifications and variations will obviously occur to those skilled in the art, and all such modifications and variations fall within the true spirit and scope of the invention.

I claim:

1. A method for treating water by ion exchange comprising: passing water through a service layer of anion and cation exchange resins in a service zone; subsequently passing said water through a leakage barrier layer of cation exchange resin in said service zone; periodically transferring said resins to a separation zone; separating and stratifying said anion and cation exchange resins by passing a liquid upwardly through said resins in said separation zone; regenerating said anion exchange resin in an anion regeneration zone; regenerating said cation exchange resin in a cation regeneration zone; transferring a portion of said cation exchange resin to said service zone to establish a leakage barrier layer of cation exchange resin; and transferring the remainder of said cation exchange resin and said anion exchange resin to said service zone whereby to establish a service resin layer.

2. The method as defined in claim 1 wherein the bottom portion of said cation exchange resin in said separation zone is transferred to said service zone to establish said leakage barrier layer.

3. The method as defined in claim 2 wherein said cation exchange resin is regenerated with an acid selected from the group consisting of sulfuric acid and hydrochloric acid and said anion exchange resin is regenerated with sodium hydroxide.

4. The method as defined in claim 3 wherein said cation exchange resin is contacted with ammonium hydroxide subsequent to said regeneration.

5. A method for treating water by ion exchange comprising; passing water through a service layer of anion and cation exchange resins in a service zone; subsequently passing said water through a leakage barrier layer of anion and cation exchange resins in said service zone; periodically transferring said resins to a separation/cation regeneration zone; separating and stratifying said anion and cation exchange resins by passing a liquid upwardly through said separation/cation regeneration zone; regenerating said anion exchange resin in an anion regeneration zone; re-stratifying said anion exchange resin by passing a liquid upwardly through said anion exchange resin in said anion regeneration zone; regenerating said cation exchange resin in said separation/cation regeneration zone; transferring a portion of said cation exchange resin to said service zone; transferring an upper portion of said anion exchange resin to said service zone, whereby to establish a leakage barrier of anion and cation exchange resins; and transferring the remaining portion of said regenerated resins to said service zone, whereby to establish a mixed resin layer.

6. The method as defined in claim 5 wherein said cation exchange resin is regenerated with an acid selected from the group consisting of sulfuric acid and hydrochloric acid and said anion exchange resin is regenerated with sodium hydroxide.

7. The method as defined in claim 6 wherein said cation exchange resin is contacted with ammonium hydroxide subsequent to said regeneration.

8. A method for treating water by ion exchange comprising: passing water through a service layer of anion and cation exchange resins in a service zone; subsequently passing said water through a leakage barrier layer of cation exchange resin in said service zone; periodically transferring said resins to a separation/cation regeneration zone; separating and stratifying said anion and cation exchange resins by passing a liquid upwardly through said resins in said separation/cation regeneration zone; transferring a major, upper portion of said anion exchange resin to an anion regeneration zone; regenerating said cation exchange resin in said separation/cation regeneration zone; regenerating said anion exchange resin in said anion regeneration zone; re-stratifying said anion exchange resin in said anion regeneration zone; transferring a bottom portion of said cation exchange resin to said service zone to reestablish said leakage barrier layer; transferring the remaining portion of said cation exchange resin to said anion regeneration zone; transferring a minor, bottom portion of said re-stratified anion exchange resin to said separation/cation regeneration zone; and transferring the remainder of said cation exchange resin and said anion exchange resin to said service zone to establish a service layer above said leakage barrier layer.

9. The method as defined in claim 8 wherein said leakage-barrier portion of said cation exchange resin is transferred to a holding zone before being transferred to said service zone, and further including the steps of ammoniating said cation exchange resin in said holding zone; and ammoniating said anion and cation exchange resins in said anion regeneration zone.

10. The method as defined in claim 9 wherein ammonium hydroxide is passed in series through said cation exchanger resin in said holding zone and then through said cation and anion exchange resins in said anion regeneration zone.

11. A method for treating water by ion exchange comprising: passing water through a service layer of anion and cation exchange resins in a service zone; subsequently passing said water through a leakage barrier layer of anion and cation exchange resins in said service zone; periodically transferring said resins to a separation/cation regeneration zone; separating and stratifying said anion and cation exchange resins by passing a liquid upwardly through said resins in said separation/cation regeneration zone; transferring a major, upper portion of said anion exchange resin to an anion regeneration zone; regenerating said cation exchange resin in said separation/cation regeneration zone; regenerating said anion exchange resin in said anion regeneration zone; re-stratifying said anion exchange resin in said anion regeneration zone; transferring a bottom portion of said cation exchange resin and an upper portion of said anion exchange resin to said service zone to re-establish said leakage barrier layer; transferring the remaining portion of said cation exchange resin to said anion regeneration zone; transferring a minor, bottom portion of said re-stratified anion exchange resin to said separation/cation regeneration zone; and transferring the remainder of said cation exchange resin and said anion exchange resin to said service zone to establish a service layer above said leakage barrier layer.

12. The method as defined in claim 11 wherein said bottom portion of said cation exchange resin and said upper portion of said anion exchange resin are transferred to a holding zone before being transferred to said service zone; and further including the step of ammoniating said resins in said holding zone.

13. The method as defined in claim 12 wherein ammonium hydroxide is passed in series through said resins in said holding zone and then through said cation and anion exchange resins in said anion regeneration zone.

14. A method for treating water by ion exchange comprising: passing water through a service layer of anion and cation exchange resins in a service zone; subsequently passing said water through a leakage barrier layer of cation exchange resin in said service zone; periodically transferring said resins to a separation/cation regeneration zone; separating and stratifying said anion and cation exchange resins by passing a liquid upwardly through said separation/cation regeneration zone; transferring a major portion of said anion exchange resin to an anion regeneration zone; regenerating said cation exchange resin in said separation/cation regeneration zone; regenerating said anion exchange resin in said anion regeneration zone; transferring said cation exchange resin from the bottom of said separation/cation regeneration zone to an upper portion of said anion regeneration zone so that said cation exchange resin is positioned on top of said anion exchange resin, with the bottom portion of said cation exchange resin from said separation/cation regeneration zone forming an interface with the top of said anion exchange resin in said anion regeneration zone; transferring a lower portion of said cation exchange resin from said anion regeneration zone to said service zone to establish a leakage barrier layer; and transferring the remainder of said anion and cation exchange resins to said service zone to establish a service layer above said leakage barrier layer.

15. The method as defined in claim 14 further including the step of passing ammonium hydroxide downwardly through said cation and anion exchange resins in said anion regeneration zone.

16. The method as defined in claim 14 further including the steps of re-stratifying said anion exchange resin in said anion regeneration zone; and transferring a lower portion of said re-stratified anion exchange resin to said separation/cation regeneration zone subsequent to transferring said cation exchange resin to said anion regeneration zone.

17. The method as defined in claim 16 wherein a central portion of said anion and cation exchange resins is transferred from said anion regeneration zone to said service zone to establish a leakage barrier layer of anion and cation exchange resins.

18. The method as defined in claim 17 further including the step of passing ammonium hydroxide downwardly through said cation and anion exchange resins in said anion regeneration zone.

References Cited

UNITED STATES PATENTS

| | | | |
|---|---|---|---|
| 2,461,505 | 2/1949 | Daniel | 210—37X |
| 2,962,438 | 11/1960 | Smith | 210—37 |
| 3,130,151 | 4/1964 | Levendusky | 210—33 |
| 3,147,215 | 9/1964 | Blight | 210—37X |
| 3,312,617 | 4/1967 | Klein | 210—35 |
| 3,334,044 | 8/1967 | Satterlee | 210—37X |
| 3,385,787 | 5/1968 | Crits et al. | 210—38X |

FOREIGN PATENTS

| | | | |
|---|---|---|---|
| 649,687 | 10/1962 | Canada | 210—33 |
| 553,233 | 5/1943 | Great Britain | 210—37 |

REUBEN FRIEDMAN, Primary Examiner

C. M. DITLOW, Assistant Examiner

U.S. Cl. X.R.

210—33, 37, 38

FO-1050
(5/69)

UNITED STATES PATENT OFFICE
CERTIFICATE OF CORRECTION

Patent No. 3,585,127                    Dated June 15, 1971

Inventor(s) Eli Salem

It is certified that error appears in the above-identified patent and that said Letters Patent are hereby corrected as shown below:

Column 1, lines 32-41, should be the second paragraph of the abstract.

Column 1, line 53, "surface" should be --surfaces--.

Column 5, line 36, the numeral "5" should be --55--.

Column 7, line 41, "out let" should be --outlet--.

Column 11, line 5, "exchanger" should be --exchange--.

Signed and sealed this 4th day of January 1972.

(SEAL)
Attest:

EDWARD M. FLETCHER, JR.
Attesting Officer

ROBERT GOTTSCHALK
Acting Commissioner of Patents